US008837949B2

(12) United States Patent
Amadeo et al.

(10) Patent No.: US 8,837,949 B2
(45) Date of Patent: Sep. 16, 2014

(54) COMPACT WIDE-ANGLE PIXELLATED ACTIVE OPTICAL LINK

(75) Inventors: Paul Amadeo, San Diego, CA (US); Allen Ripingill, Turner Falls, MA (US); David Robinson, San Diego, CA (US); Irene Chen, San Diego, CA (US)

(73) Assignee: Cubic Corporation, San Diego, CA (US)

(*) Notice: Subject to any disclaimer, the term of this patent is extended or adjusted under 35 U.S.C. 154(b) by 622 days.

(21) Appl. No.: 12/623,298

(22) Filed: Nov. 20, 2009

(65) Prior Publication Data

US 2010/0135668 A1    Jun. 3, 2010

Related U.S. Application Data

(60) Provisional application No. 61/116,594, filed on Nov. 20, 2008.

(51) Int. Cl.
*H04B 10/00* (2013.01)
*H04B 10/112* (2013.01)

(52) U.S. Cl.
CPC .................................. *H04B 10/1125* (2013.01)
USPC ............ 398/128; 398/118; 398/126; 398/129; 398/130

(58) Field of Classification Search
CPC ...... H04B 10/00; H04B 10/11; H04B 10/112; H04B 10/1121; H04B 10/1123; H04B 10/1125; H04B 10/1127; H04B 10/1129; H04B 10/114; H04B 10/1141; H04B 10/1143; H04B 10/1149; H04B 10/116
See application file for complete search history.

(56) References Cited

U.S. PATENT DOCUMENTS

| | | | | |
|---|---|---|---|---|
| 5,068,916 A | * | 11/1991 | Harrison et al. | 455/39 |
| 5,539,562 A | * | 7/1996 | Morioka et al. | 398/131 |
| 6,154,299 A | | 11/2000 | Gilbreath et al. | |
| 6,624,916 B1 | * | 9/2003 | Green et al. | 398/169 |
| 6,954,302 B2 | | 10/2005 | Sayyah et al. | |
| 7,142,348 B2 | | 11/2006 | Sayyah et al. | |
| 7,317,876 B1 | | 1/2008 | Elliott | |
| 2002/0071160 A1 | * | 6/2002 | Pavelchek | 359/152 |
| 2002/0109884 A1 | * | 8/2002 | Presley et al. | 359/172 |
| 2004/0130769 A1 | | 7/2004 | Sayyah et al. | |
| 2006/0239696 A1 | | 10/2006 | Sayyah et al. | |
| 2007/0065150 A1 | * | 3/2007 | Sikora et al. | 398/118 |
| 2007/0297805 A1 | | 12/2007 | Rabinovich et al. | |

* cited by examiner

*Primary Examiner* — Darren E Wolf

(74) *Attorney, Agent, or Firm* — Kilpatrick Townsend & Stockton LLP

(57) ABSTRACT

A system, method, and optical communication device are disclosed. The system can include a plurality of optically coupled nodes forming an optical communication network. Each node may include an array of pixel elements, each pixel element having an optical detector and an active optical source. The pixel array may be disposed in a backplane of a lens that is configured to map incoming optical signals to pixel locations in the backplane according to their respective angles of incidence and to minimize a deviation at each pixel location between incoming optical signals arriving at the optical detector and emissions from the optical source. The node may include a processor and memory. The processor can register senders in the optical network at locations in the pixel array and can generate routing information by which to route communications from the registered senders to other pixel elements for transmission to their respective destinations.

21 Claims, 11 Drawing Sheets

| Pixel ID | Sender ID | Last Access | Encryption | Link Expires |
|---|---|---|---|---|
| (1, 3) | 110-c | 21:32 | L1 | 23:00 |
| (2, 5) | 110-d | 19:12 | L3 | 0:30 |
| (2, 2) | UNK | BLOCK | BLOCK | BLOCK |
| ⋮ | ⋮ | ⋮ | ⋮ | ⋮ |

FIG. 9

| Destination Address | Next hop | Total hops | Pixel ID | Link Status |
|---|---|---|---|---|
| 110-b | 110-c | 2 | (1, 3) | X |
| 110-b | 110-d | 3 | (2, 5) | OK |
| 110-d | 110-d | 1 | (2, 5) | OK |
| Base | RF Link | 1 | N/A | OK |
| ⋮ | ⋮ | ⋮ | ⋮ | ⋮ |

FIG. 10

COMPACT WIDE-ANGLE PIXELLATED ACTIVE OPTICAL LINK

CROSS-REFERENCE TO RELATED APPLICATION

This application claims the benefit of and is a non-provisional of U.S. Provisional Application 61/116,594 filed on Nov. 20, 2008, which is assigned to the assignee hereof and incorporated herein by reference for all purposes.

BACKGROUND

Radio frequency transmissions can be used to form a communication network in which messages are exchanged between network devices. However, RF signals can be susceptible to spoofing in which an intruder attempts to use the network to send unauthorized messages. To the extent that the intruder is able to mimic RF characteristics of the communication signal, other network devices may be unable to distinguish the spoofed messages from authentic communications.

Other types of communication systems rely on reflected signals to pass messages between devices. Such reflected communications can have a limited operating range as signal power falls off rapidly with distance. Moreover, reflected communication systems often depend upon a precise alignment between the transmitting element and the reflecting element. If this alignment is disturbed or cannot be established, communications may fail. These shortcomings can lead to unreliable communications, particularly under difficult conditions such may be experienced in a battlefield environment.

BRIEF SUMMARY

A system, method, and optical communication device are disclosed. The system can include a plurality of optically coupled nodes forming an optical communication network. Each node may include an array of pixel elements, each pixel element having an optical detector and an active optical source. The pixel array may be disposed in a backplane of a lens that is configured to map incoming optical signals to pixel locations in the backplane according to their respective angles of incidence and to minimize a deviation at each pixel location between incoming optical signals arriving at the optical detector and emissions from the optical source. The node may include a processor and memory. The processor can register senders in the optical network at locations in the pixel array and can generate routing information by which to route communications from the registered senders to other pixel elements for transmission to their respective destinations.

In one embodiment, an optical communication apparatus is disclosed. The apparatus includes a housing having an aperture for receiving optical communication signals and a lens disposed within the aperture. The lens is configured to direct the optical communication signals to locations in a backplane according to their respective angles of incidence. The apparatus also includes a pixel array that is situated in the backplane and optically coupled to the lens. Each pixel in the pixel array includes an optical detector and an active optical source. A memory stores registration information including associations between pixels in the array of pixels and one or more senders in an optical network. A processor is coupled to the memory and demodulates an inbound communication signal incident upon a first pixel in the array of pixels. The processor determines whether an identifier of the inbound communication signal matches a sender associated with the first pixel based on the registration information and, if there is a match, the processor modulates the optical source of a second pixel in the array of pixels with an outbound communication signal.

In another embodiment, a method of sending and receiving data in an optical network is disclosed. The network includes a node having an array of pixels in which each pixel includes an optical detector and an active optical source. The method includes generating registration information including a plurality of associations between pixels in the array of pixels and senders in the optical network and detecting an inbound communication signal at the optical detector of a first pixel in the array of pixels. The method also includes obtaining an identifier of the inbound communication signal and determining whether the identifier of the inbound communication signal matches a sender associated with the first pixel based on the registration information. The method includes modulating the optical source of a second pixel in the array of pixels with an outbound communication signal in response to determining that the identifier of the inbound communication signal matches the registration information.

Additional aspects of the invention will become apparent from the following description and with reference to the accompanying drawings.

BRIEF DESCRIPTION OF THE DRAWINGS

FIG. 9 shows exemplary registration information.

FIG. 10 shows exemplary routing data.

In the figures, similar components and/or features may have the same reference label. Also, various components of the same type may be distinguished by following the reference label with a second label. If only the first reference label is used, the description is applicable to any of the similar components designated by the first reference label.

DETAILED DESCRIPTION

Figure 1A:
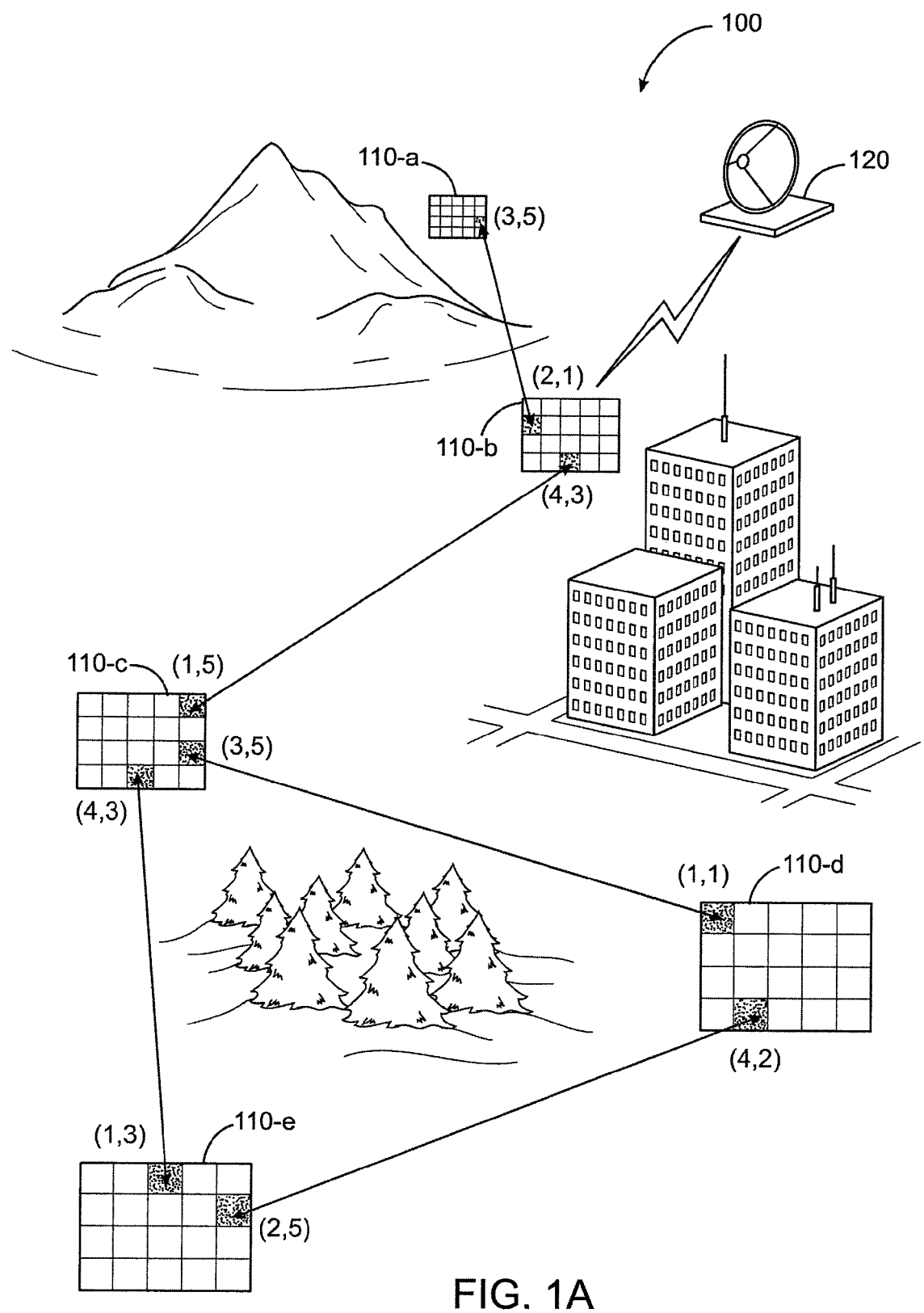
FIGS. 1A-1B show an exemplary optical communication system.

FIG. 1A shows an exemplary optical communication system 100. As illustrated, communication system 100 includes a plurality of nodes 110 which collectively form an optical communication network. Each node 110 is a point-to-multipoint communication device which can send optical communication signals to and receive optical communication signals from other nodes 110 in the network. As used herein, optical communication signals can include electromagnetic radiation with wavelengths in the visible and/or infrared spectrum. Preferably, such signals are highly collimated beams such as can be generated by a laser source.

Nodes 110 can be positioned throughout an operating environment and can automatically join with other nodes to form the optical network. For example, in a battlefield environment, nodes 110 can be seeded in strategic locations and can identify and communicate with other nodes upon activation. The optical network formed by nodes 110 is self-healing in that non-responsive nodes can be bypassed and communications can follow alternate paths in the event that particular node is damaged.

Each node 110 may include an array of pixels at which optical communication signals are sent and received. Each pixel in the array corresponds to a distinct region in the node's optical coverage area. For example, as shown, node 110-*d* may communicate with node 110-*e* using a pixel located at the second column of the fourth row (4, 2) in its pixel array. The coordinates of the communicating pixel reflect a spatial relationship between the pair of nodes. In the example, optical communication signals from node 110-*d* are incident upon node 110-*e* at pixel location (2, 5), optical communication signals from node 110-*e* to node 110-*c* have an angle of incidence corresponding to pixel location (4, 3), and so on. Note that the size or granularity of the region may be determined by the number of pixels in the array.

Nodes 110 may register a particular sender at a particular pixel location and can share their mappings with other nodes. The mappings can be assembled into routing tables at each node which, in turn, can be used to calculate routes within the optical network. For example, node 110-*e* may associate node 110-*c* with pixel (1, 3) of its pixel array. If node 110-*e* wishes to send a message to node 110-*b* it may determine from its routing tables that node 110-*b* can be reached either directly, through node 110-*c*, or through a combination of nodes 110-*d* and 110-*c*. In this situation, the direct path is preferred. However, consistent with the self-healing capabilities of the optical network, node 110-*d* can provide an alternative route in the event that the optical link between node 110-*e* and 110-*c* is interrupted, or that node 110-*c* is otherwise deemed non-responsive to communications from 110-*e*.

Figure 1B:
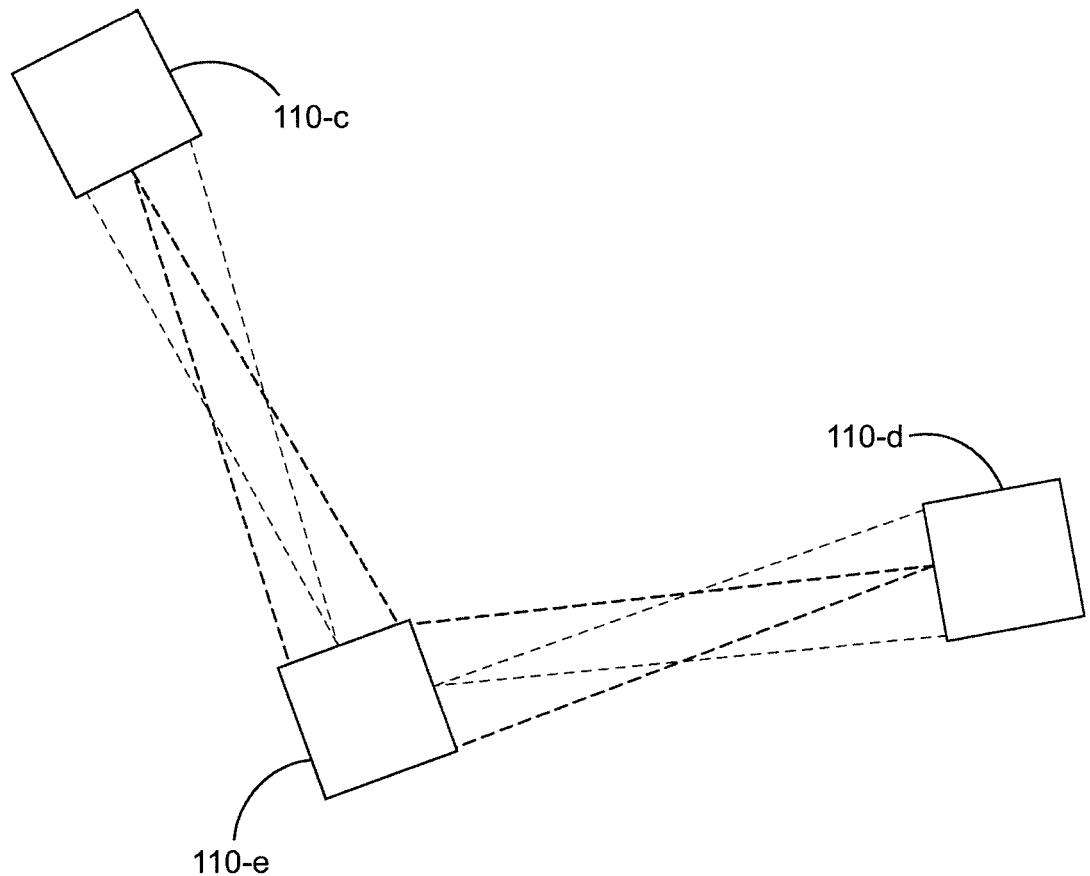

Each node 110 can support multiple optical links simultaneously. For example, as shown in FIG. 1B, node 110-*e* can receive optical signals from node 110-*d* while transmitting optical signals to node 110-*c*. Similarly, node 110-*e* can transmit optical communication signals to nodes 110-*d* and 110-*c* simultaneously, and can support any other combination of sending and receiving signals at locations in its pixel array. Nodes 110 can also include an uplink capability for communicating with an RF transceiver 120 located beyond the boundaries of the optical network. In addition, nodes 110 can be provisioned with sensor elements for collecting data relating to their surroundings and can be configured to send sensor data to other nodes in the optical network or to a predetermined collection point.

An optical network of nodes 110 provides many advantages over conventional communication systems. Unlike radio frequency (RF) networks, optical communication system 100 can use a node's location to avoid spoofing. An RF signal, on the other hand, may be accepted as authentic if it simply has the required characteristics. System 100 requires optical communication signals to have not only the requisite characteristics (e.g., modulation, encryption, etc.), but also to be received at a pixel that is presently associated with or registered to a particular sender. Nodes 110 can use angle of incidence of a communication signal to detect an intruder. Moreover, unlike RF signals, optical signals cannot be jammed by radio frequency transmissions and are thus well-suited for use in hostile areas.

Optical communication system 100 also offers an extended operating range compared with systems which rely on retro-reflection. Since optical power falls off as the square of distance, a retro-reflected communication returns to its transmitter with $1/R^4$ of its transmit power. By contrast, nodes 110 include an active optical source (such as a laser) at each pixel in their pixel arrays. Thus, for a given detection capability, nodes 110 have greater effective range than retro-oriented systems. Finally, nodes 110 are operative to route signals received at one pixel in the array for transmission at a different pixel in the array, promoting reliable and efficient network communications.

Figure 2:
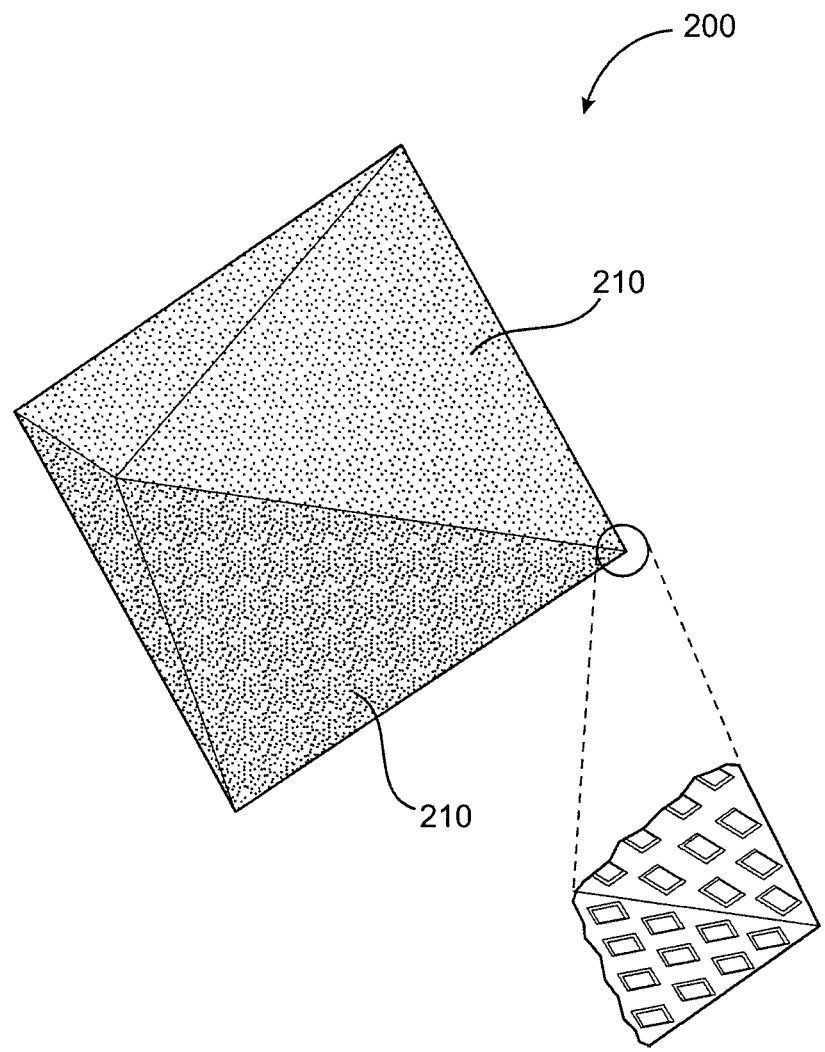
FIG. 2 shows one embodiment of an optical communication device.

FIG. 2 shows an exemplary optical communication device 200. Optical communication device 200 can be a node 110 in communication system 100 and includes plurality of pixellated surfaces 210 arranged to maximize its optical coverage area. In the example, optical communication device 200 includes a total of six planar pixel-array elements 210 arranged in opposing pyramidal structures and is designed to detect and transmit optical signals at any angle in a $4\pi$ steradian coverage area. Advantageously, optical communication device 200 is ruggedized and can be dropped from high altitudes such as from an aircraft. Upon landing, optical communication device 200 can initiate a network formation process to identify and register other communication devices within its extended optical coverage area.

Figure 3:
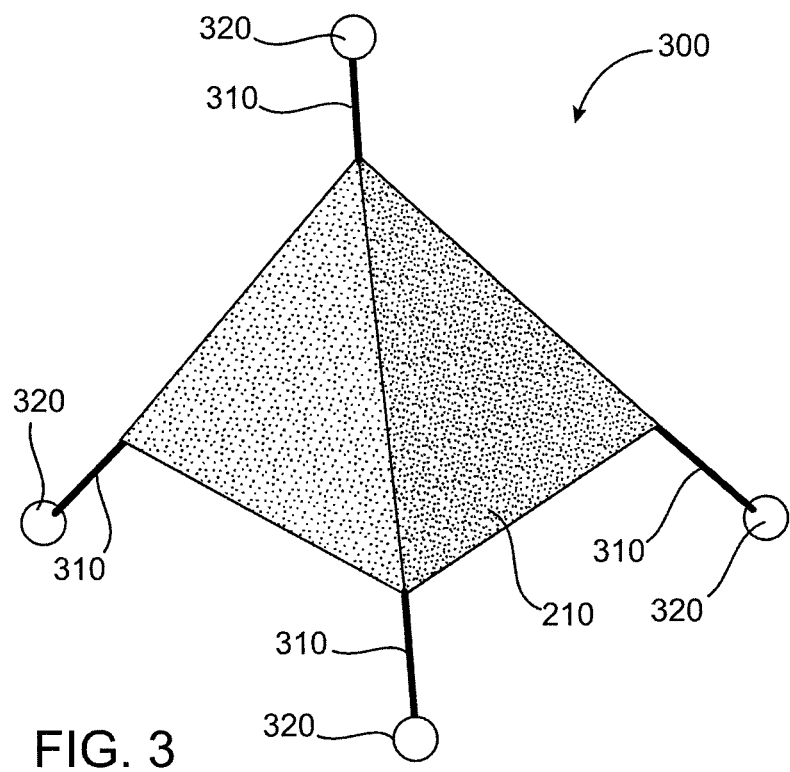
FIG. 3 shows another embodiment of an optical communication device.

FIG. 3 shows another embodiment of an optical communication device 300 which can operate as a node 110 in system 100. Optical communication device 300 includes a total of four planar pixel-arrays 210 arranged in a tetrahedron shape. Supports 310 are attached to the pixel-array structure and hold optical communication device 300 at a distance above the ground. Supports 310 can be coupled to sensors 320. Sensors 320 can gather data relating to environmental conditions for transmission to other nodes in the optical communication network. For example, sensors 320 can be ground-vibration sensors configured to detect movement of equipment or personnel. Alternatively, sensors 320 can be video capture or listening devices for conducting surveillance of an area. In some designs, a combination of sensors may be used which may, in turn, be controlled by commands received remotely over the optical network.

Figure 4:
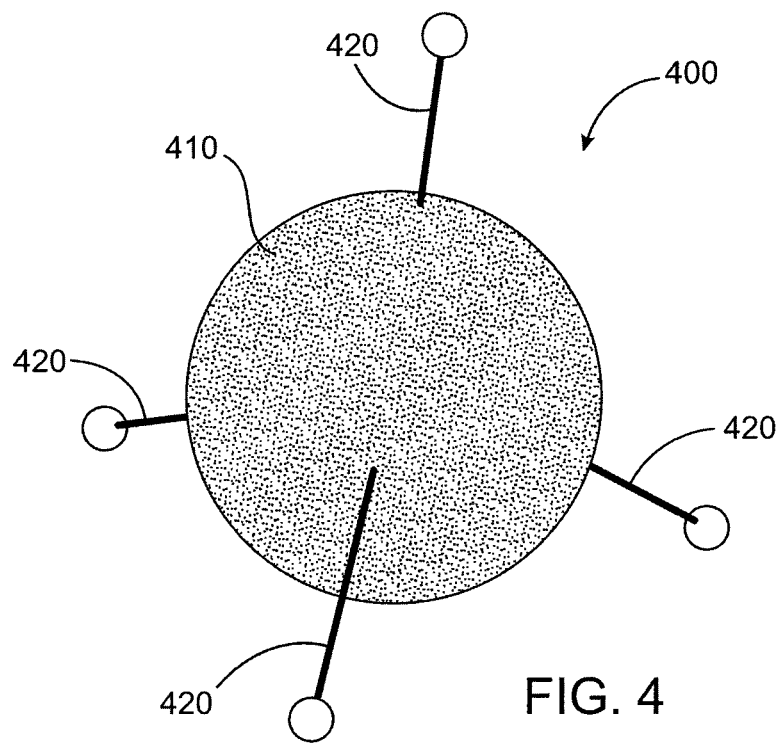
FIG. 4 shows a further embodiment of an optical communication device.

FIG. 4 shows yet another embodiment of an optical communication device 400 which can operate as a node 110 in the optical network of system 100. As illustrated, planar pixel array elements 210 are replaced by a spherical structure 410. Individual pixels can be attached directly to the spherical structure or they can be joined to a substrate which is then adhered to the spherical structure. In one embodiment, a printed electronics process is used to transfer pixel electronics on to the surface of the device. In this example, sensors 320 may be replaced (or supplemented) by RF antennas 420 which are connected to an RF communication device. The RF communication device can support a radio link between nodes of the optical network and, for example RF transceiver 120. As described below, control electronics such as a processor, memory, optical modulator/demodulator, etc. can be disposed within the spherical or planar structures formed by the pixel array elements.

Figure 5:
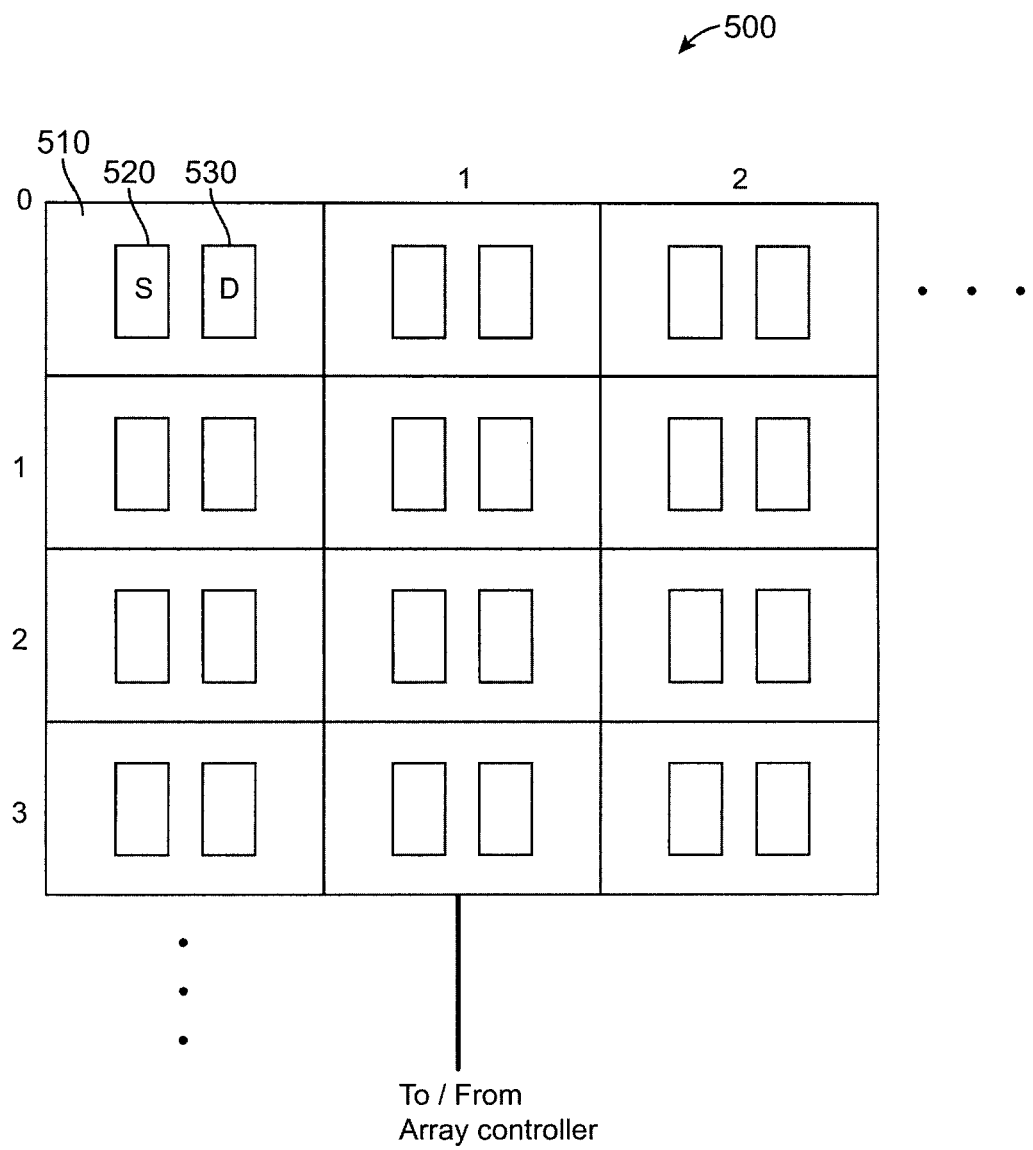
FIG. 5 shows one embodiment of a pixel array element.

FIG. 5 shows one embodiment of a pixel array element 500. Pixel array 500 can be formed on a single substrate such as an integrated circuit and can include a plurality of individual pixels 510. Alternatively, pixels 510 can be discrete elements which are attached to a common substrate such as in the case of printed electronics. Each pixel 510 in array 500 can be individually addressed by an array controller either sequentially (e.g., 1, 2, 3 . . . ), or based on its position in the array (e.g., (row, column)) and any number of pixels can be operated concurrently to support multiple optical links.

As shown, each pixel 510 includes an optical source 520 and an optical detector 530. Optical sources 520 can be lasers that produce highly collimated beams of light. For example, the lasers can be infrared light-emitting diodes (LEDs) configured to emit a narrow beam which is modulated with a communication signal. In one embodiment, optical sources 510 are vertical cavity surface emitting lasers (VCSELs) operative to emit a signal that is substantially perpendicular to the array substrate. Optical detectors 530 can be photodiodes or other photodetecting elements sensitive to light at wavelengths used for communication. For example, optical detectors 530 can be formed from silicon, germanium, indium gallium arsenide, or other photosensitive materials. An array controller is coupled to the input of each optical source 520 and to the output of each optical detector 530 for controlling operation of array 500 on a pixel-by-pixel basis.

Figure 6:
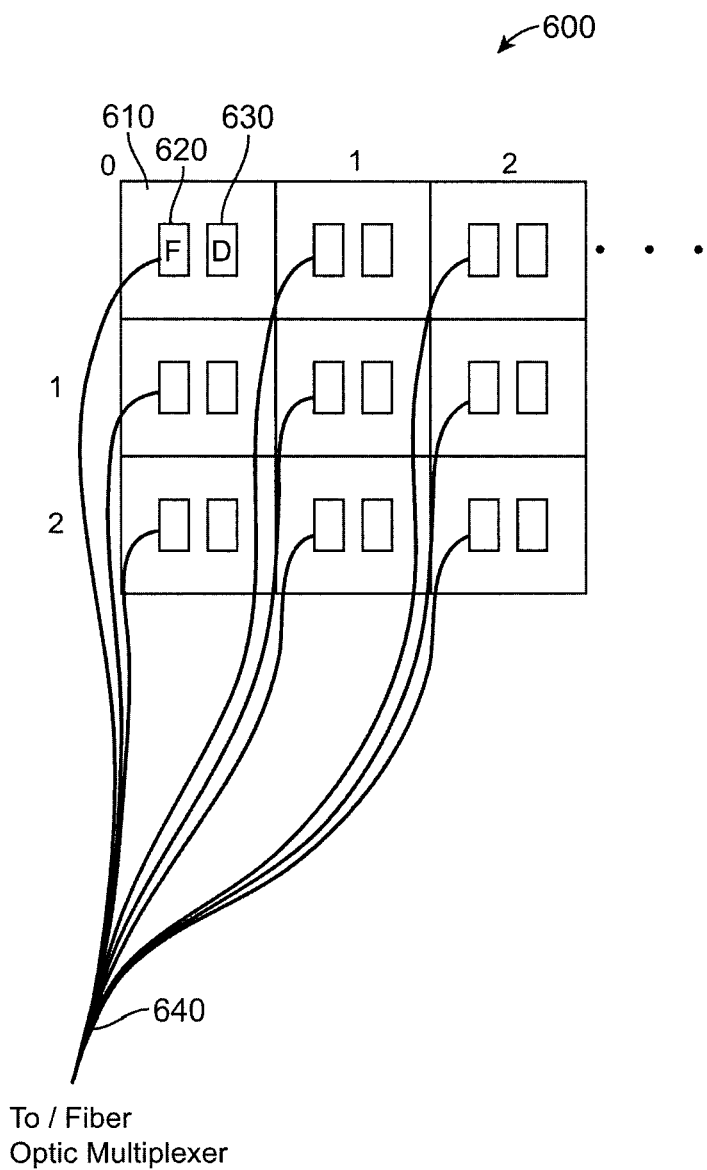
FIG. 6 shows another embodiment of a pixel array element.

FIG. 6 shows another embodiment of a pixel array element 600. Pixel array 600 is similar to pixel array 500 in that each pixel 610 includes an active optical source 620 and an optical detector 630 which are individually addressable by a controller. Optical detectors 630 can be as previously described. However, in this example, a fiber-optic laser (not shown) serves as the optical source. The fiber-optic laser can be coupled to an optical source location (F) of each pixel 610 by a fiber bundle 640. The fiber bundle 640, in turn, can be coupled to a fiber-optic multiplexer which selectively connects the fiber-optic laser source with the individual pixel locations.

A fiber-optics embodiment such as array element 600 can be used, for example, to create flexible array structures for special-purpose applications or in combination with existing devices. Fiber optic pixels support the use of a higher-power optical source than otherwise could be added at each pixel location, and are therefore well-suited for extended range communications through time-multiplexing the source among multiple links. A similar arrangement can be implemented for the optical detector elements, wherein pixels share access to one (or more) high-performance detectors.

Figure 7:
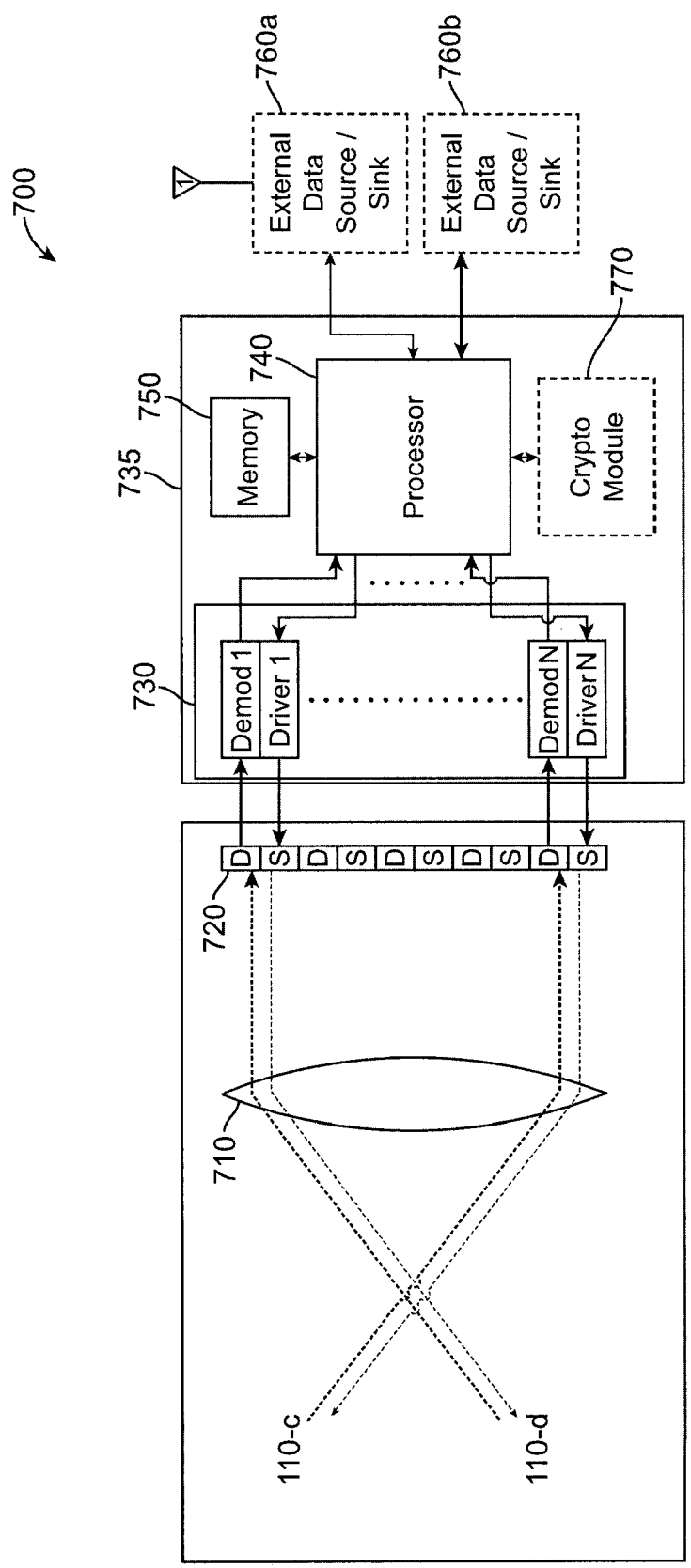
FIG. 7 shows a block diagram of an optical communication device.

FIG. 7 is a block diagram of an optical communication device 700. For purposes of discussion, optical communication device 700 will be described with reference to node 110-e in system 100 shown in FIG. 1A. As illustrated, optical communication device 700 includes a lens 710, a pixel array 720, an array controller 730, a processor assembly 735, and external data elements 760. The various parts of optical communication device 700 can be disposed within a housing to protect them from the environment. Alternatively, one or more pixel arrays 720 can be arranged to form an enclosure and the various elements can be housed within the enclosure. In one embodiment, processor assembly 735 is disposed within the enclosure and external data elements 760 are positioned on or about the enclosure as shown in FIG. 2, FIG. 3, and FIG. 4.

Pixel array 720 can be an array of optical sources and detectors as described in connection with FIG. 5 and FIG. 6. Pixel array 720 is optically coupled to lens 710 and is situated in its backplane. Lens 710 maps incoming communications signals to pixel locations based on their angle of incidence and passes signals from the pixel locations out of optical communication device 700 along substantially the same path as the incoming signals. In various embodiments, lens 710 is an optical arrangement and is mathematically designed to constrain a deviation of the inbound and outbound signals at any given pixel location in array 720 to be within a predetermined tolerance.

Constraining deviation at each mapped pixel location ensures that inbound and outbound signals traverse nearly the same path between two communication nodes. As shown in the figure, for example, an inbound communication signal from node 110-d passes through lens 710 and is mapped to a first pixel location in array 720. The inbound signal is received by an optical detector (D) of the first pixel. Due to the lens design, emissions from the optical source (S) at the first pixel location exit from lens 710 along a substantially similar path towards node 110-d. In like manner, lens 710 optically links the n-th pixel in array 720 with node 110-c and constrains a deviation between inbound and outbound signals at that pixel location. Preferably, lens 710 is formed from an optical medium with at least one element having an index of refraction of at least three (n≥3) and provides a field of view of approximately ±60° in relation to its optical axis.

Pixel array 720 is coupled to an array controller 730. Array controller 730 can include addressable optical driver and demodulator circuits for each individual pixel. At each pixel, an optical driver output of the array controller can be coupled to an optical source input and a demodulator input of the array controller can be coupled to the corresponding optical detector output. The I/O of array controller 730 can be coupled to pins of a processor 740 which, in turn, can read from and write to any combination of elements during its operating cycles. Alternatively, with fiber-optic or shared detector embodiments, a multiplexer can be added between array controller 730 and processor 740 for selectively controlling the elements at each pixel location.

Processor 740 can include one or more programmable logic elements such as complex programmable logic devices (CPLDs), field-programmable gate arrays (FPGAs), application-specific integrated circuits (ASICs), microcontrollers, microprocessors, and the like. The one or more programmable logic elements can be configured to execute program instructions which cause optical communication device 700 to carry out the functions described herein. As shown in the figure, processor 740 is coupled to a memory 750. Memory 750 can store data and program instructions available to processor 740 during device operation. Memory 750 may include one or more random-access memory (RAM), read-only memory (ROM), or other volatile or non-volatile computer-readable storage elements.

Processor 740 is also coupled to external data elements 760 and to a cryptographic module 770. External data elements 760 can include data sources such as environmental sensors. For example, video capture equipment, listening devices, ground vibration sensors, or any combination of external sources may be coupled to and controlled by processor 740. External data elements 760 can also include an RF communications device for communicating with radio frequency devices or other communications equipment. Many other data sources and sinks can be used within the scope of the present invention.

Cryptographic module 770 encrypts outbound communications from and decrypts inbound communications to optical communication device 700. In various embodiments, cryptographic module 770 supports the secure authentication of senders in the optical network in connection with registration and routing functions. Cryptographic module 770 can include multiple encryption algorithms and may support different types and/or levels of encryption on different optical links.

Figure 8:
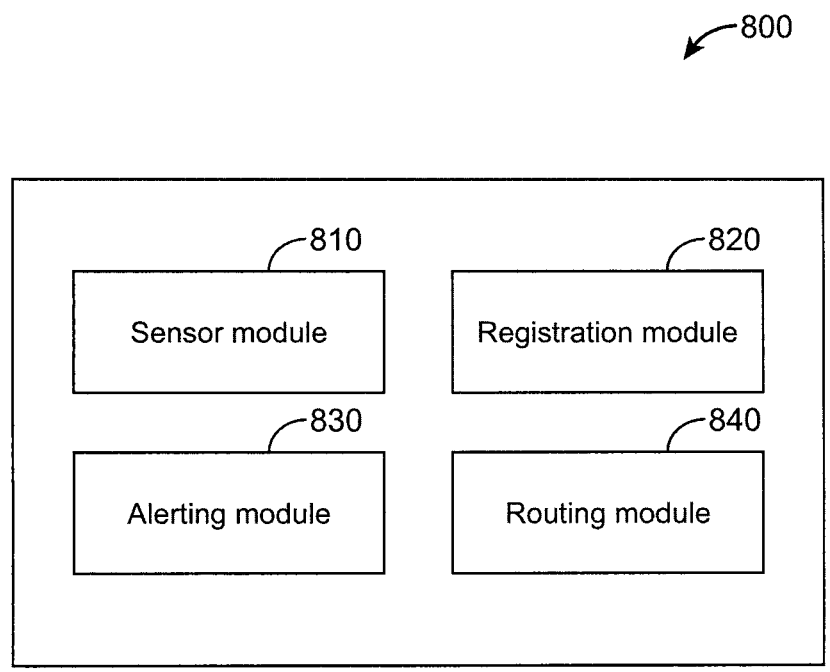
FIG. 8 shows exemplary processing modules used with an optical communication device.

FIG. 8 is a block diagram 800 showing exemplary processing modules of optical communication device 700. Sensor module 810 can be configured to monitor and control the operation of external elements 760 such as environmental sensors and/or RF communications equipment. For example, in response to commands received over the optical network, sensor module 810 can activate one or more of the sensor elements and can transmit data obtained from the sensors to other network nodes. Sensor module 810 can also track sensor levels over time and generate an alert message when the sensor data changes abruptly or exceeds an established threshold.

Registration module 820 can establish associations between nodes in the optical network and one or more pixels in pixel array 720. In one embodiment, registration module 820 stores and updates registration data in memory 750. Processor 740 can use the registration data to determine whether communications arriving at a specified pixel should be processed or discarded.

FIG. 9 shows exemplary registration data 900 such as can be generated by registration module 820. When an optical communication is received and demodulated, registration module 820 can obtain an identifier corresponding to its sender. The identifier (Sender ID) can be a network address, a host name, a digital signature, or some other information with which to uniquely identify the sender within the optical network. Registration module 820 can determine whether the Sender ID of a communication matches a record in the registration data 900. If a match is found, registration module 820 can further determine whether the Sender ID is registered at the Pixel ID where the communication was received.

As an example of this operation, suppose that an optical communication is detected at pixel (2, 5) of pixel array 720. Array controller 730 demodulates the optical detector output and passes it to processor 740. Processor 740 can recover the identifier at a known location in the demodulated data. For example, the incoming optical signal may have a header portion and a payload portion. Processor 740 can extract the identifier from the header portion and pass it to registration module 820 together with the address of the pixel (2, 5) at which the communication was received. Registration module 820 can access registration 900 in memory 750 and determine that pixel location (2, 5) is registered to Sender ID "110-$d$." If the identifier of the communication matches "110-$d$," registration module 820 can retrieve additional information such as a last-access time, link-expiration, encryption type, etc. A further check can then be performed to determine if the link has expired based on system time and/or the amount of time that has elapsed since the last communication with the sender.

When no sender is registered at a receiving pixel or the identifier of the inbound communication does not match the registration data 900, the transaction can be passed to alerting module 830. Alerting module 830 may initiate a challenge-response procedure by which to authenticate the identity of the sender at the unregistered pixel location. The challenge-response procedure may be run through cryptographic module 770 and will result in either a successful or failed authentication. If the authentication is successful, registration module 820 can update registration data 900 by adding a new record to associate the authenticated sender with the new pixel location and removing any other associations after which communications can proceed normally. On the other hand, if the authentication fails, the subject pixel can assign a "blocked" status such as illustrated in FIG. 9 by Pixel ID (2, 2). While a pixel is in blocked status, no communications are permitted. As an additional measure, when authentication fails, alerting module 830 can send a targeted or broadcast message to other nodes signaling that an intruder to the optical network was detected. The message from alerting module 830 can include the intruder identifier, the date/time, an estimate of the coordinates, and other relevant data.

Optical communication device 700 also includes a routing module 840. Routing module 840 facilitates the exchange of messages and provides a means for mapping destination addresses within the optical network to locations in pixel array 720. In one embodiment, routing module 840 stores and updates routing tables in memory 750. Processor 740 can utilize the routing tables to determine how to process communications to and from registered senders.

FIG. 10 shows exemplary routing data 100 such as can be generated and maintained by routing module 840. As shown, routing data 1000 includes Destination Address, Next Hop, Total Hops, Pixel ID, and Link Status elements. The destination address can be obtained from an inbound communication received from a node in the optical network that has completed the registration process, or it can be an address of the optical communication device itself. Routing module 840 can use the destination address to determine a next hop, a transmit Pixel ID, and link status information.

As an example of this operation, suppose that optical communication device 700 (node 110-$e$) wishes to send a message to node 110-$b$ via the optical communication system shown in FIG. 1. As illustrated in the figure, there are two possible routes. As a first route, node 110-$e$ could send its message to node 110-$c$, and node 110-$c$ could forward the message to its destination at node 110-$b$. This route is recorded in the first row of registration data 1000 which shows node 110-$c$ as the next hop to destination address 110-$b$ via transmit Pixel ID (1, 3). As a second route, node 110-$e$ could send its message to node 110-$d$, node 110-$d$ could forward the message to node 110-$c$, and node 110-$c$ could deliver the message to its destination at node 110-$b$. This route is recorded in the second row of registration data 1000 which shows node 110-$d$ as the next hop via transmit Pixel ID (2, 5).

Routing module 840 can periodically request routing information from registered nodes with which to build routing tables. When more than one route to a destination is available, routing module 840 can select a route based on additional criteria. For example, routing module 840 may select a route that has the fewest total hops to a destination and would thus prefer to route communications to destination 110-$b$ through node 110-$c$ rather than using node 110-$d$. Routing module 840 would therefore determine that pixel (1, 3) should be used to transmit the message to its destination. However, in the event that a link is disrupted, routing module 840 can select an alternative route to the destination. The link status element can be used to signify that an optical link to a registered node is temporarily unavailable.

Figure 11:
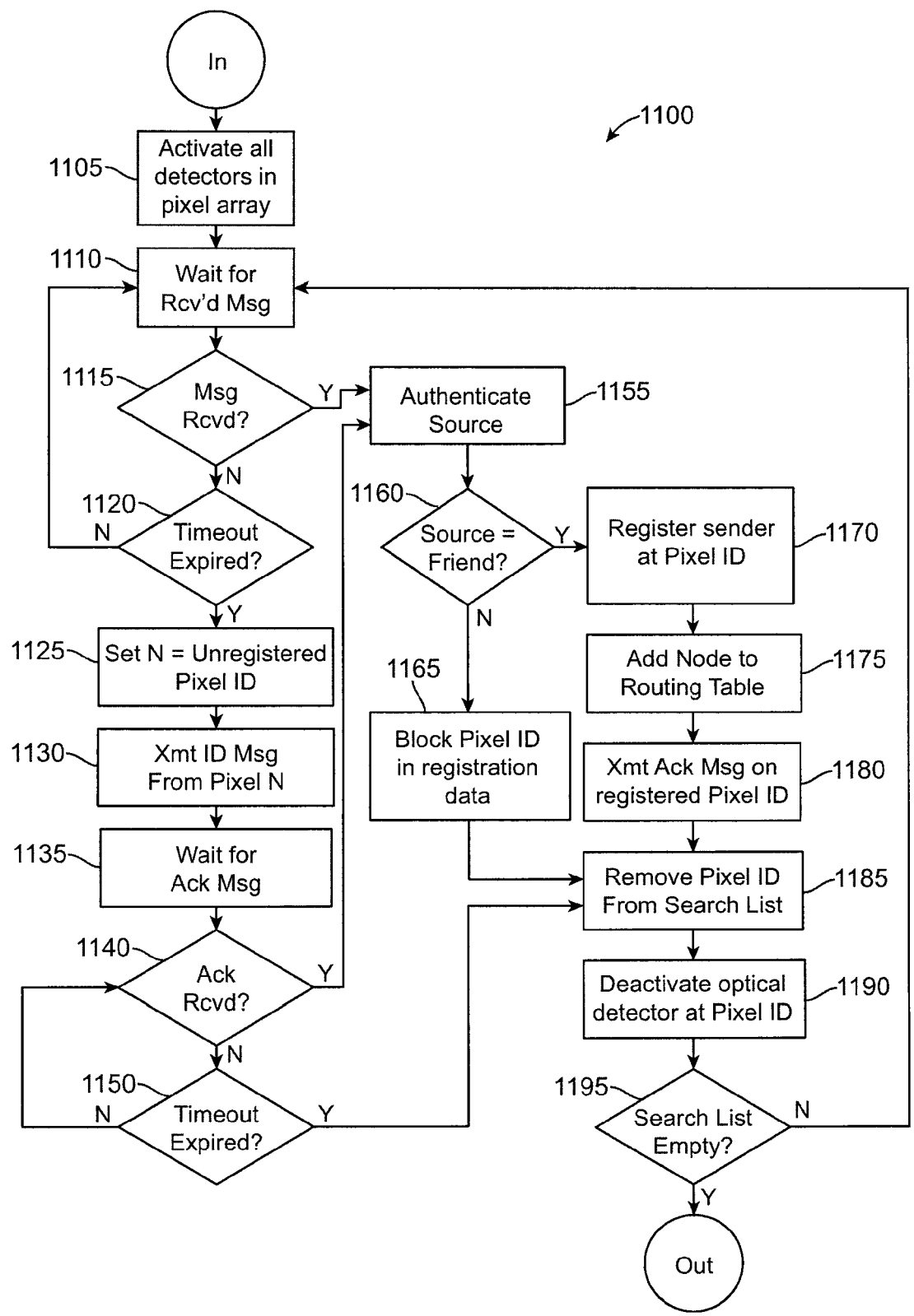
FIG. 11 shows an exemplary process performed by an optical communication device.

FIG. 11 shows an exemplary process 1100 by which an optical communication device discovers network elements in the formation or maintenance of an optical network. Process 1100 can be performed by processor 740 of optical communication device 700 operating as part of the system 100 of FIG. 1.

Prior to entering discovery, existing registration data and/or routing table entries can be cleared from memory and the various data structures used by optical communication device can be initialized. At block 1105, processor 740 activates all of the optical detectors in pixel array 720 and generates a search list of pixel locations with which to track progress of the discovery process. At block 1110, processor 740 monitors the output of array controller 730 to detect inbound messages.

When an inbound message is detected, block 1115, processor 740 attempts to authenticate the sender. In some embodiments, crypto module 770 initiates a cryptographic exchange as part of the authentication process. For example, cryptographic module 770 may retrieve keying material, challenge-response sequences, encryption algorithms, whitelists, and other relevant information from memory 750. At block 1160, a friend-foe status of the sending node is determined as a result of the authentication. If the authentication fails and the sender does not have friendly status, processor 740 blocks the pixel location from further communication at block 1165, removes the pixel from its search list at block 1185, and deactivates the corresponding optical detector at block 1190. Blocking communication at a pixel may be accomplished, for example, by adding a "blocked" entry to registration data 900 or by some other means.

If authentication is successful, processor 740 updates the registration data at block 1170 to include a new association between the authenticated sender and the pixel at which the communication was received. Additionally, at block 1175, processor 740 can add an entry for the authenticated sender to its routing tables thereby expanding its view of the optical network. After updating the registration data and routing tables, processor 740 may transmit an acknowledgement signal at block 1180 to the authenticated sender indicating that communication between the devices can proceed. At block 1190, processor 740 removes the authenticated pixel location from its search list, and at block 1190 deactivates the optical detector at the pixel location. If it is determined that the search list is empty, block 1195, the discovery process is complete. Otherwise, processor 740 continues monitoring the output of array controller 730 for inbound signals at block 1110.

If a timeout period expires without receiving an inbound message, at block 1125 processor 740 may transition to an active search mode. At block 1125, processor 740 selects one of the unregistered pixel locations in its search list (N) and transmits an identification message from that pixel location. The identification message can include an identifier of the optical communication device and may serve as a request to initiate communications. At block 1135, processor 740 monitors pixel location N for an acknowledgement of the identification message. If an acknowledgement is received prior to expiration of a timeout period, block 1140, then processing continues with authentication at block 1155. If the timeout expires without an acknowledgement being received then, at blocks 1185-1190, pixel location N is removed from the search list and its optical detector is deactivated.

Figure 12:
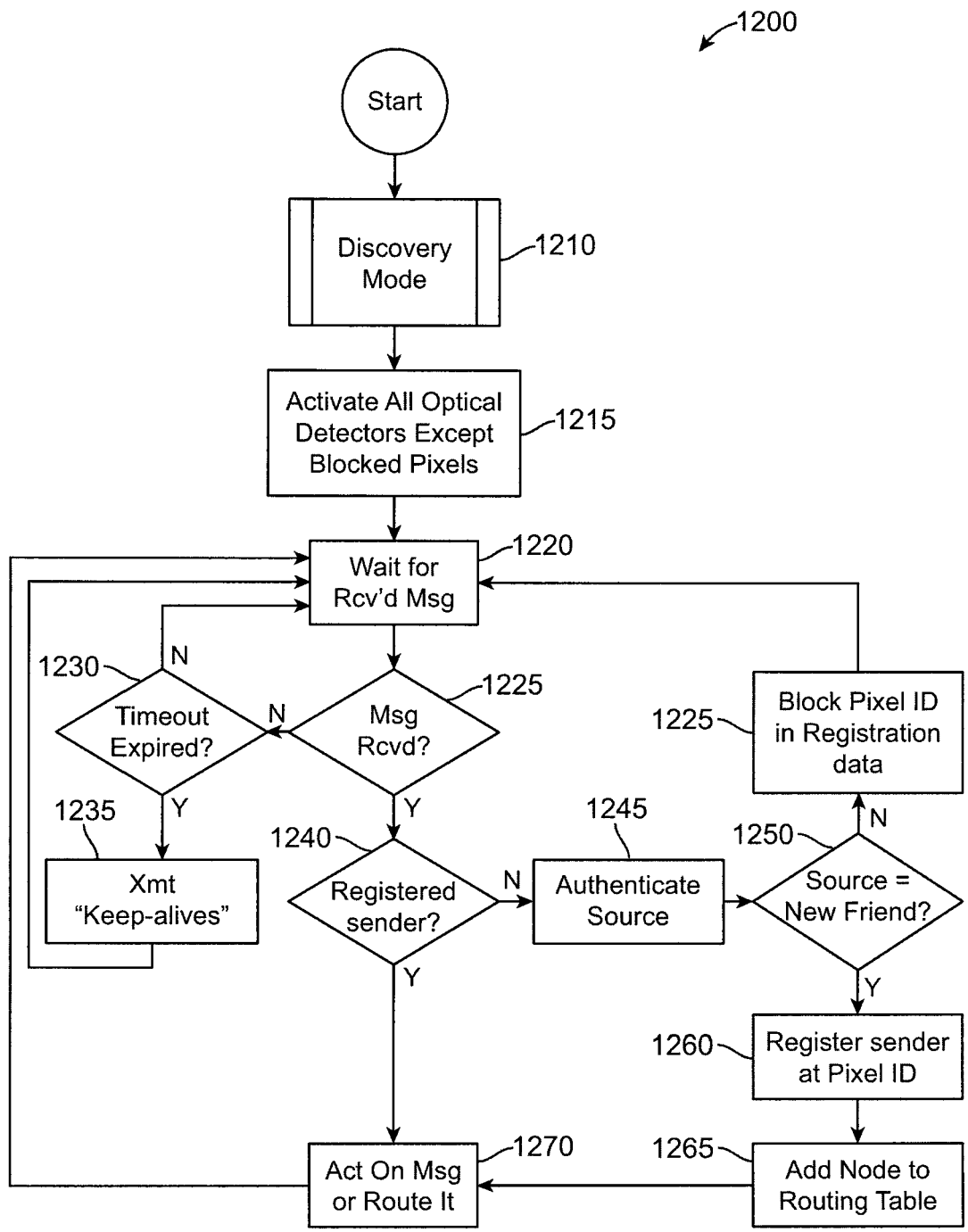
FIG. 12 shows another exemplary process performed by an optical communication device.

FIG. 12 shows an exemplary process 1200 by which an optical communication device operates within an optical network. Process 1200 can be performed by processor 740 of optical communication device 700.

Prior to operation, a number of optical communication devices are distributed in a location that will host the optical network. For example, in a combat situation, optical communication devices may be installed at strategic battlefield locations or dispersed by aircraft to form the initial optical network. In such cases, it may be preferable to seed devices having a wide optical coverage area such as the optical communication devices shown in FIG. 2, FIG. 3, and FIG. 4.

At block 1210, the optical communication device enters discovery mode and can perform process 1100 to initialize registration and routing tables based on its view of the optical network. At block 1215, when discovery mode is complete, processor 740 activates optical detectors at all pixels that have not been marked as blocked. For example, processor 740 can read each entry in its registration table. If the entry indicates a blocked sender at a pixel location, the corresponding optical detector is deactivated by array controller 730 or remains deactivated. All other optical detectors in the pixel array are powered on.

At block 1220, processor 740 monitors the unblocked pixels for communication activity. If an inbound message is detected, block 1240, processor 740 determines whether the sender has been registered. For example, processor 740 can search registration data 900 for an entry corresponding to the receiving pixel. If the entry exists and indicates that the pixel location has been associated with the sender then, at block 1270, processor 740 can act upon the message. For example, processor 740 can determine a network address of the inbound message. If the message is addressed to the receiving optical device, then processor 740 can pass it to an external data sink 760 or can execute an appropriate command.

If the message is addressed to a different node, processor 740 can route it to a new location within the communication system. Using the destination address, processor 740 can retrieve one or more entries from routing tables 1000 with which to determine an appropriate next hop. The next hop can be another optical node or it can be the RF communications device. For example, when a predetermined network address is detected, sensor module 810 can activate the RF communications device to transmit the inbound optical message or to receive an inbound RF communication. In this way, the optical communication device can preserve battery power by sending and/or receiving RF messages at selected times or in response to predetermined events.

For destination addresses within the optical network, processor 740 can access routing data 1000 to determine which pixel in the pixel array is associated with the next hop device. Once the determination is made, processor 740 can modulate the optical source of the next hop pixel with information from the message to be routed. In one embodiment, processor 740 simply repeats or forwards the inbound message at the next hop pixel. In other embodiments, processor 740 may update a message header and/or payload information and send the updated message to the next hop device. Processing then continues at block 1220.

If no registration data is available, block 1245, the sender is authenticated. Authentication can proceed as described in connection with process 1100 and, at block 1250, results in a friend-foe determination for the unregistered sender. If authentication is successful and the sender is given a friendly status then, at block 1260, the authenticated sender is registered at the receiving pixel location and, at block 1265, processor 740 updates its routing tables with information about the sender. The message is then acted upon at block 1270. This process allows new devices to join an existing network. On the other hand, if authentication is not successful, then the pixel location is blocked from further communication and processing continues at block 1220.

If no incoming messages are received in a predetermined interval, a timeout period expires at block 1230. At block 1235, processor 740 transmits "keep-alive" messages at the registered pixel locations. The keep-alive messages can be used to maintain active optical links. Processor 740 can also retrieve last-access and link-expiration information from the registration data and can terminate a link that is deemed to be non-responsive. If the last-access time on the link is older than a predetermined value, for example, the link may be deemed non-responsive. Terminating a non-responsive link can involve removing its entries from the registration data and routing tables. Processor 740 may also actively expire a link. In that case, the sender may be required to re-authenticate and processor 740 may update the registration data and routing tables accordingly.

While the principles of the disclosure have been described above in connection with specific apparatuses and methods, it is to be clearly understood that this description is made only by way of example and not as a limitation on the scope of the disclosure. Persons of skill in the art will recognize that the present invention may be embodied in other specific forms and those skilled in the art will understand, or be able to ascertain using no more than routine experimentation, many equivalents to the specific embodiments of the invention described herein. Such equivalents are intended to be encompassed by the appended claims.

What is claimed is:

1. An optical communication apparatus, comprising:
a housing having an aperture for receiving optical communication signals;
a lens disposed within the aperture and configured to direct the optical communication signals to locations in a backplane according to their respective angles of incidence;
a pixel array situated in the backplane and optically coupled to the lens, each pixel in the pixel array comprising an optical detector and an active optical source, wherein:
the optical detector of each pixel converts an optical signal to a corresponding electric signal,
the active optical source of each pixel converts an electric signal to a corresponding optical signal, and the optical detector and the active optical source are interleaved on a same plane to form the pixel array,
each pixel in the pixel array is configured to send and receive the optical communication signals at a unique angle of incidence;
a memory configured to store registration information comprising associations between pixels in the pixel array and one or more senders in an optical network; and
a processor coupled to the memory and configured to determine, from an inbound electric signal corresponding to an inbound optical signal received at a first pixel in the pixel array, whether an identifier of the inbound electric signal matches a sender associated with the first pixel based on the registration information, the processor being further configured to generate, for the active optical source of a second pixel in the pixel array, an outbound electric signal in response to determining that the identifier of the inbound electric signal matches the registration information.

2. The apparatus of claim 1, wherein the processor is configured to generate an alert signal in response to determining that the identifier of the inbound electric signal of the first pixel does not match the registration information and to modulate the active optical source of a third pixel in the pixel array with the alert signal.

3. The apparatus of claim 1, wherein the processor is configured to perform a discovery process comprising:
modulating the active optical source of each pixel in the pixel array with a discovery message;
authenticating responses to the discovery message; and
updating the registration information to include an association between an authenticated sender and a pixel in the pixel array.

4. The apparatus of claim 2, wherein the memory stores one or more routing tables, and the processor is configured to retrieve routing information from the one or more routing tables based on a destination address of the inbound electric signal and to generate the outbound electric signal such that the outbound electric signal includes the routing information and a payload of the inbound electric signal.

5. The apparatus of claim 1, further comprising:
an antenna; and
an RF communications device coupled to the antenna and the processor, wherein the processor controls an operation of the RF communications device in response to detecting a predetermined message content or an absent destination address of the inbound electric signal modulating the active optical source of the second pixel.

6. The apparatus of claim 1, wherein the processor comprises a cryptographic module configured to decrypt an information element of the inbound electric signal and to encrypt an information element of the outbound electric signal.

7. The apparatus of claim 1, wherein the processor is configured to remove the sender from the registration information in response to determining that the sender does not respond to a communication of the apparatus.

8. The apparatus of claim 1, further comprising:
a sensor configured to gather data relating to an environment of the apparatus, and wherein the processor is configured to modulate the active optical source of at least one pixel in the pixel array based on the data from the sensor.

9. The apparatus of claim 1, wherein the lens comprises an optical arrangement configured to limit a deviation between inbound and outbound signals at each pixel in the pixel array.

10. The apparatus of claim 2, wherein the processor is configured to modulate the active optical source of the third pixel concurrently with demodulating the inbound electric signal.

11. The apparatus of claim 1, wherein the pixel array comprises an application-specific integrated circuit (ASIC) and each pixel is disposed on a same substrate.

12. The apparatus of claim 11, wherein the active optical source of each pixel in the pixel array comprises vertical cavity surface emitting laser.

13. The apparatus of claim 2, wherein the pixel array comprises at least three planar array elements arranged so as to cover at least $2\pi$ steradians.

14. The apparatus of claim 2, wherein the processor is configured to modulate the active optical source of the second pixel concurrently with modulating the active optical source of the third pixel.

15. A method of sending and receiving data in an optical network with a network node having a pixel array, each pixel comprising an optical detector and an active optical source, the method comprising:
generating registration information comprising a plurality of associations between pixels in the pixel array and one or more senders in the optical network;
detecting an inbound electric signal at the optical detector of a first pixel in the pixel array, wherein the optical detector of each pixel converts an optical signal to a corresponding electric signal;
obtaining an identifier of the inbound electric signal;
determining whether the identifier of the inbound electric signal matches a sender associated with the first pixel based on the registration information; and
modulating the active optical source of a second pixel in the pixel array with an outbound electric signal in response to determining that the identifier of the inbound electric signal matches the registration information, wherein:
the active optical source of each pixel converts the outbound electric signal to a corresponding optical signal,
the optical detector and the active optical source of each pixel are interleaved on a same plane to form the pixel array, and
each pixel in the pixel array is configured to send and receive the optical signal at a unique angle of incidence.

16. The method of claim 15, further comprising:
generating an alert signal in response to determining that the identifier of the inbound electric signal of the first pixel does not match the registration information; and
modulating the active optical source of a third pixel in the pixel array with the alert signal.

17. The method of claim 15, wherein generating the registration information comprises:
modulating the active optical source of each pixel in the pixel array with a discovery message;
detecting an acknowledgment message of the discovery message at one or more of the pixels in the pixel array;
authenticating senders of each pixel in the pixel array where the acknowledgement message is detected; and
updating the registration information to include an association between an authenticated sender and a pixel in the pixel array.

18. The method of claim 15, wherein the inbound electric signal comprises a destination address and a payload, the method further comprising:
retrieving routing information from a memory of the network node based on the destination address;
determining a location of the second pixel in the pixel array based on the routing information; and
generating the outbound electric signal using the routing information and the payload.

19. The method of claim 18, further comprising activating an RF communications device in response to detecting a predetermined message content or the destination address absent modulating the active optical source of the second pixel.

20. The method of claim 15, further comprising removing the sender from the registration information in response to determining that the sender does not respond to a communication of the network node.

21. The method of claim 15, further comprising:
retrieving data from a sensor coupled to the network node;
modulating the active optical source of a predetermined pixel in the pixel array with the data from the sensor.

* * * * *